US012489249B2

(12) United States Patent
Shiu et al.

(10) Patent No.: US 12,489,249 B2
(45) Date of Patent: Dec. 2, 2025

(54) QUICK RELEASING MECHANISM AND ELECTRONIC DEVICE INCLUDING THE SAME

(71) Applicant: WISTRON CORP., New Taipei (TW)

(72) Inventors: Meng Chian Shiu, New Taipei (TW); Kun Shan Lee, New Taipei (TW); Ping Sheng Su, New Taipei (TW); Chienping Kuo, New Taipei (TW); Kuei Cheng Chu, New Taipei (TW); Yu Jen Lee, New Taipei (TW)

(73) Assignee: WISTRON CORP., New Taipei (TW)

( * ) Notice: Subject to any disclaimer, the term of this patent is extended or adjusted under 35 U.S.C. 154(b) by 308 days.

(21) Appl. No.: 18/362,055

(22) Filed: Jul. 31, 2023

(65) Prior Publication Data

US 2024/0388037 A1 Nov. 21, 2024

(30) Foreign Application Priority Data

May 16, 2023 (CN) ........................ 202310553431.X

(51) Int. Cl.
*H01R 13/629* (2006.01)
*H01R 13/639* (2006.01)

(52) U.S. Cl.
CPC ..... *H01R 13/62938* (2013.01); *H01R 13/639* (2013.01)

(58) Field of Classification Search
CPC ............ H01R 13/62938; H01R 13/639; H01R 13/629; H01R 13/62
USPC .......................................................... 439/157
See application file for complete search history.

(56) References Cited

U.S. PATENT DOCUMENTS

| | | | | |
|---|---|---|---|---|
| 6,558,183 B1 * | 5/2003 | Ji | H01R 13/6275 | 439/358 |
| 6,592,391 B1 * | 7/2003 | Wu | H01R 13/6275 | 439/352 |
| 7,147,502 B1 * | 12/2006 | Wu | H01R 13/6335 | 439/352 |
| 7,309,250 B2 * | 12/2007 | Reed | H01R 13/6275 | 439/352 |

(Continued)

FOREIGN PATENT DOCUMENTS

| | | |
|---|---|---|
| CN | 104679171 B | 5/2018 |
| CN | 112731596 A | 4/2021 |

(Continued)

OTHER PUBLICATIONS

TW Office Action dated Mar. 20, 2024 in Taiwan application No. 112120304.

*Primary Examiner* — Harshad C Patel
(74) *Attorney, Agent, or Firm* — McClure, Qualey & Rodack, LLP

(57) ABSTRACT

A quick releasing mechanism includes an engagement component and a releasing component. The engagement component includes an arm structure. The arm structure has an engagement part. The releasing component is movably disposed on the engagement component. The releasing component includes a pressing protrusion for selectively pressing against the arm structure. When the releasing component is moved relative to the engagement component, the pressing protrusion of the releasing component presses against the arm structure to force the engagement part to rotate relative to the releasing component.

18 Claims, 17 Drawing Sheets

(56) References Cited

U.S. PATENT DOCUMENTS 7,311,545 B2 * 12/2007 Wu .................... H01R 13/6275
439/358
7,318,740 B1 * 1/2008 Henry ................ H01R 13/6335
439/352
7,322,845 B2 * 1/2008 Regnier ............. H01R 13/6275
439/352
7,445,484 B2 * 11/2008 Wu .................... H01R 13/6584
439/352
7,473,124 B1 * 1/2009 Briant .................. H01R 13/629
439/352
D589,455 S * 3/2009 Wu ........................... D14/435.1
7,503,794 B2 * 3/2009 Haller .................. H01R 13/633
439/357
7,572,138 B1 * 8/2009 Wu .................... H01R 13/6275
439/352
7,581,978 B1 * 9/2009 Briant ................ H01R 13/6275
439/358
8,231,400 B2 * 7/2012 Phillips ................ G02B 6/4201
439/357
8,303,325 B2 * 11/2012 Yang .................... H01R 13/635
439/372
8,388,366 B2 * 3/2013 Yang .................. H01R 13/6335
439/357
8,506,319 B2 * 8/2013 Ritter ................. H01R 13/6275
439/352
8,764,491 B2 * 7/2014 Wang ................... H01R 13/508
439/660
8,961,217 B2 * 2/2015 Dang ..................... H01R 13/58
439/607.47
9,287,660 B2 * 3/2016 Henry ................ H01R 13/6275
9,599,778 B2 * 3/2017 Wong ................... G02B 6/3879
9,728,871 B1 * 8/2017 Gutgold ................. H01R 12/52
10,020,614 B1 * 7/2018 Bucher .............. H01R 13/6275
10,665,991 B2 * 5/2020 Li ...................... H01R 13/6275
10,700,474 B2 * 6/2020 Chen .................. H01R 13/6335
10,790,614 B1 9/2020 Chen et al.
10,797,440 B1 10/2020 Chen et al.
2010/0130063 A1 * 5/2010 Lang .................. H01R 13/6593
439/607.17
2011/0045702 A1 * 2/2011 Su ........................ H05K 3/3405
439/607.56
2011/0111618 A1 * 5/2011 Su ...................... H01R 13/6275
439/357
2011/0195586 A1 * 8/2011 Wu ...................... H01R 13/512
439/152
2012/0052714 A1 * 3/2012 Zerebilov .......... H01R 13/6275
439/372
2012/0063100 A1 * 3/2012 Su ...................... H01R 13/6658
361/747
2012/0214350 A1 * 8/2012 Wu .................... H01R 13/5812
439/676
2016/0126672 A1 * 5/2016 Kawamura .......... H01R 13/633
439/153
2018/0323544 A1 * 11/2018 Wu .................... H01R 13/6275

FOREIGN PATENT DOCUMENTS

TW M590323 U 2/2020
TW 202044686 A 12/2020
TW 202044688 A 12/2020

* cited by examiner

QUICK RELEASING MECHANISM AND ELECTRONIC DEVICE INCLUDING THE SAME

CROSS-REFERENCE TO RELATED APPLICATIONS

This non-provisional application claims priority under 35 U.S.C. § 119 (a) on Patent Application No(s). 202310553431.X filed in China on May 16, 2023, the entire contents of which are hereby incorporated by reference.

TECHNICAL FIELD

The disclosure relates a quick releasing mechanism, more particularly to a quick releasing mechanism applied to a plug and an electronic device including the same.

BACKGROUND

Various sockets are usually provided on a casing or internal assemblies of an electronic device such as a server or a computer host, so that a user can insert desired plugs thereinto. Furthermore, based on the requirements of reliability and safety, snap-fit mechanisms may be provided between connectors of some plugs and the sockets. When one plug is inserted into one socket, the snap-fit mechanism can firmly fix the connector of the plug into the socket for effectively preventing the plug from being accidentally detached from the socket due to an external force. Certainly, this type of snap-fit mechanism is required to be operable by the user, so that the user can remove the limitation of the snap-fit mechanism to the plug during the removal of the plug.

However, as components, assemblies and modules in the electronic device are arranged more compactly, a space near the socket for the user to access or operate the snap-fit mechanism becomes smaller. More particularly to an electronic device having small height, the space near the socket and the plug is too small for fingers of the user to access and operate the snap-fit mechanism, which causes the plug fixed into the socket by the snap-fit mechanism to be difficult to be pulled out of the socket.

SUMMARY

As a result, the disclosure provides a quick releasing mechanism and an electronic device including the same which are capable of solving the issue that the plug is difficult to be pulled out of the socket due to the insufficient space near the socket.

One embodiment of the disclosure provides a quick releasing mechanism. The quick releasing mechanism includes an engagement component and a releasing component. The engagement component includes an arm structure. The arm structure has an engagement part. The releasing component is movably disposed on the engagement component. The releasing component includes a pressing protrusion for selectively pressing against the arm structure. When the releasing component is moved relative to the engagement component, the pressing protrusion of the releasing component presses against the arm structure to force the engagement part to rotate relative to the releasing component.

Another embodiment of the disclosure provides an electronic device. The electronic device includes an electronic assembly and a quick releasing mechanism. The engagement component includes an arm structure. The arm structure has an engagement part. The releasing component is movably disposed on the engagement component. The releasing component includes a pressing protrusion for selectively pressing against the arm structure, when the releasing component is switched from an unactuated state to an actuated state, the pressing protrusion of the releasing component presses against the arm structure to force the engagement part to move from an engagement position to a released position for being disengaged from the socket.

According to the quick releasing mechanism and the electronic device including the same as discussed in the above embodiments, at least part of the releasing component is movably disposed on the engagement component, and the releasing component includes the pressing protrusion to selectively press against the arm structure, such that when the engagement component is applied to the plug, the user can drive the releasing component to force the pressing protrusion to press against the arm structure so as to remove the limitation of the engagement component to the plug, thereby enabling the user to easily pull the plug out of the socket.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Aspects and advantages of the disclosure will become apparent from the following detailed descriptions with the accompanying drawings. The inclusion of such details provides a thorough understanding of the disclosure sufficient to enable one skilled in the art to practice the described embodiments but it is for the purpose of illustration only and should not be understood to limit the disclosure. On the contrary, it is intended to cover alternatives, modifications, and equivalents as can be included within the spirit and scope of the described embodiments as defined by the appended claims. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features.

It is to be understood that the phraseology and terminology used herein are for the purpose of better understanding the descriptions and should not be regarded as limiting. Unless specified or limited otherwise, the phrase "at least one" as used herein may mean that the quantity of the described element or component is one or more than one but does not necessarily mean that the quantity is only one. The term "and/or" may be used herein to indicate that either or both of two stated possibilities.

Figure 1:
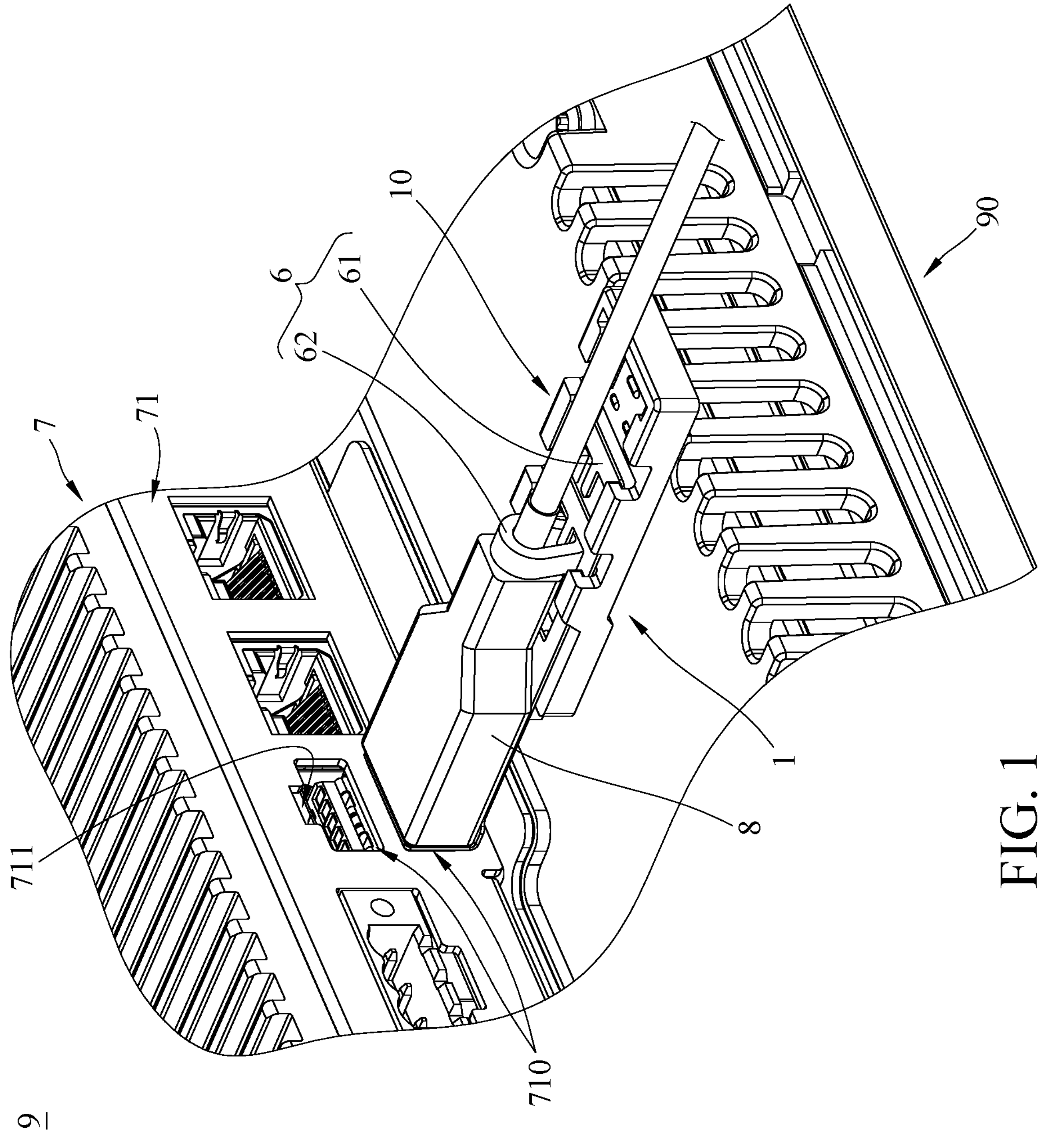
FIG. 1 is a partial and enlarged perspective view of an electronic device according to one embodiment of the disclosure.

Firstly, referring to FIG. 1, one embodiment of the disclosure provides an electronic device 9. The electronic device 9 is, for example but not limited to, a server, a computer host or a part thereof. For example, the electronic device 9 may be a 1U server, but the disclosure is not limited thereto. The electronic device 9 may include a support structure 90. The support structure 90 may be a part of the electronic device 9 to accommodate required electronic or non-electronic assemblies, components, modules, structures or sets. For example, the support structure 90 may be a bottom base of a casing of the electronic device 9 or a main plate or a frame in the casing of the electronic device 9, but the disclosure is not limited thereto. In this embodiment, the support structure 90 of the electronic device 9 may support an electronic assembly 7. The electronic assembly 7 is, for example, a hard disk drive or another suitable electronic assembly, but the disclosure is not limited thereto.

Moreover, the electronic assembly 7 has an input/output interface 71 located at one side of the electronic assembly 7, and the input/output interface 71 enables required connectors to be electrically connected to the electronic assembly 7. For example, the input/output interface 71 may include at least one socket 710 for at least one plug 8 to be inserted thereinto. Also, each plug 8 may be provided with a fixing assembly 6. The fixing assembly 6 can be engaged with one side of the socket 710 (e.g., an edge 711 shown in the figures), thereby enhancing the stability of the plug 8 in the socket 710 and preventing the plug 8 from accidentally detached from the socket 70 due to an unexpected external force. Therefore, when the plug 8 is required to be detached from the socket 710, the engagement relationship between the fixing assembly 6 and the input/output interface 71 is required to be removed.

It should be concerned that when the electronic device 9 is a 1U server or a server having less space in a height direction, the sockets 710 of the input/output interface 71 may be arranged in a compact manner, side by side, in a vertical direction. Therefore, although the figures merely show one plug 8, it can be understood that when all of the sockets 710 are respectively plugged with the plugs 8, the plugs 8 are also arranged in a compact manner, side by side, in a vertical direction. In such a case, a space around the socket 710 is too small to enable fingers to directly access the fixing assembly 6. In other words, in an environment with a smaller interior space and the sockets compactly arranged, it is difficult for a user to directly operate the fixing assembly 6 by fingers to remove the limitation of the fixing assembly 6 to the plug 8. As a result, this embodiment provides a quick releasing mechanism 1, and the quick releasing mechanism 1 includes a releasing component 10 disposed on the fixing assembly 6 for enabling a user to easily remove the limitation of the fixing assembly 6 to the plug 8.

Figure 2:
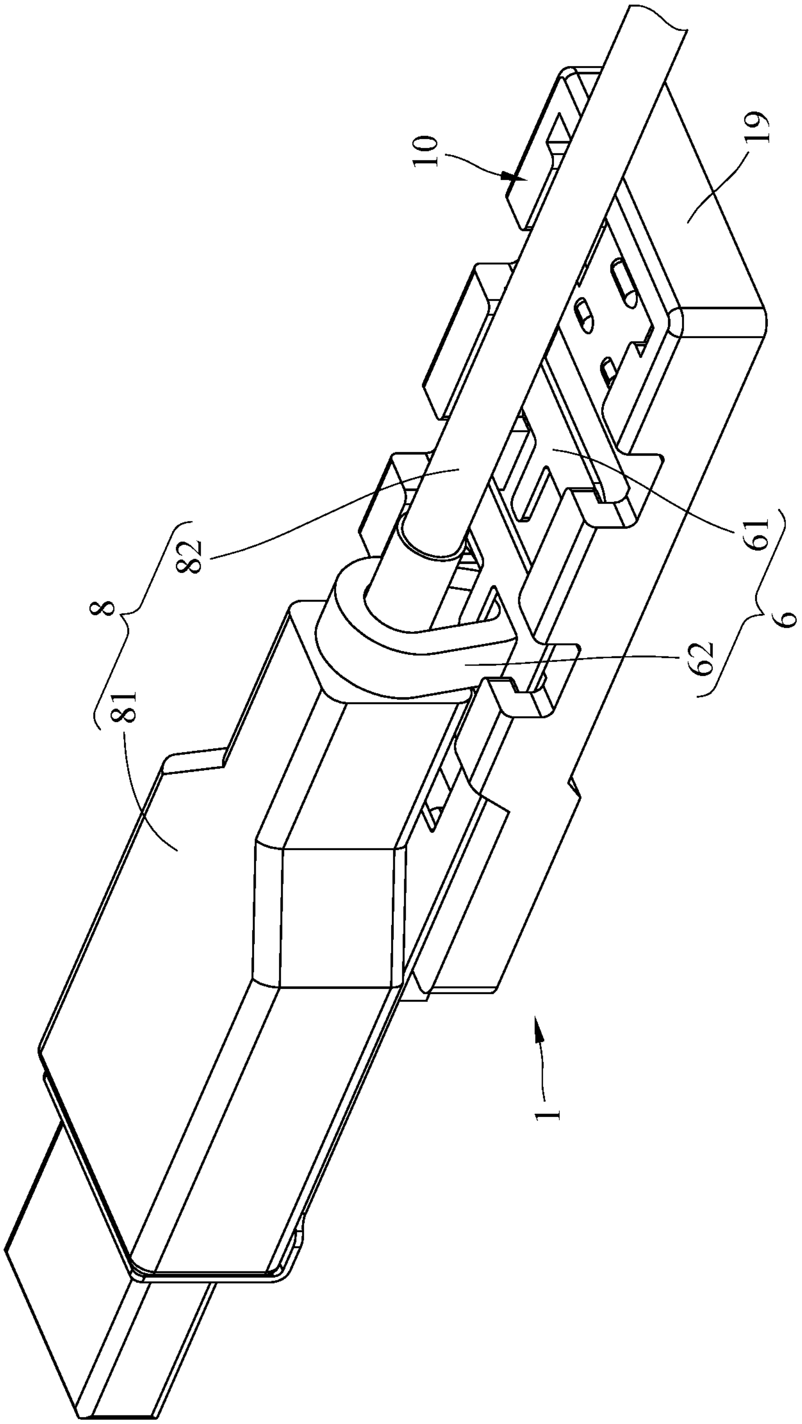
FIGS. 2 and 3 are perspective views of a plug and a quick releasing mechanism installed on the plug in FIG. 1 according to one embodiment of the disclosure.
Figure 4:
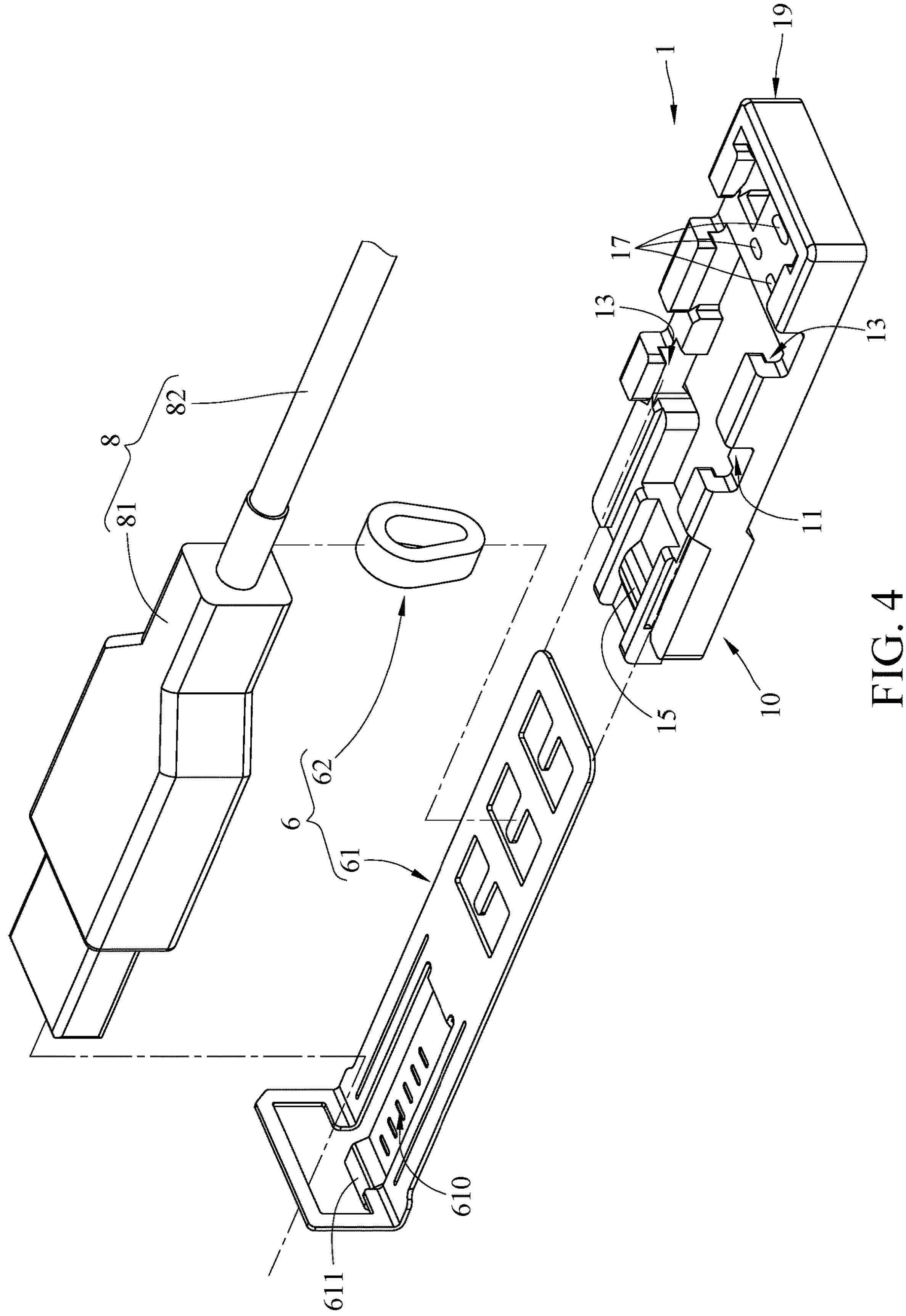
FIG. 4 is an exploded view of the plug and the quick releasing mechanism in FIG. 2.

Specifically, referring to FIGS. 2 and 4, the plug 8 may further include a plug part 81 and a cable part 82. The plug part 81 is a connector part of the plug 8 which is configured to be directly inserted into the socket 710, and the cable part 82 is a part of the plug 8 which extends outwards from one end of the plug part 81. The type and specification of the plug 8 introduced herein is merely exemplary, the disclosure is not limited thereto. The fixing assembly 6 may include an engagement component 61 and a fastener 62. The engagement component 61 may be, but not limited to, a single piece made of plastic, metal or the combination thereof having a desired elasticity. In this embodiment, the engagement component 61 may be sized and shaped to fit in a narrow space located at one side of the plug part 81 of the plug 8. The fastener 62 may be, but not limited to, any suitable ring-shaped component. For example, the fastener 62 may be a cable tie or a strap. As a result, the fastener 62 can surround the cable part 82 of the plug 8 and a part of the engagement component 61 for fastening the plug 8 and the engagement component 61 together.

Figure 3:
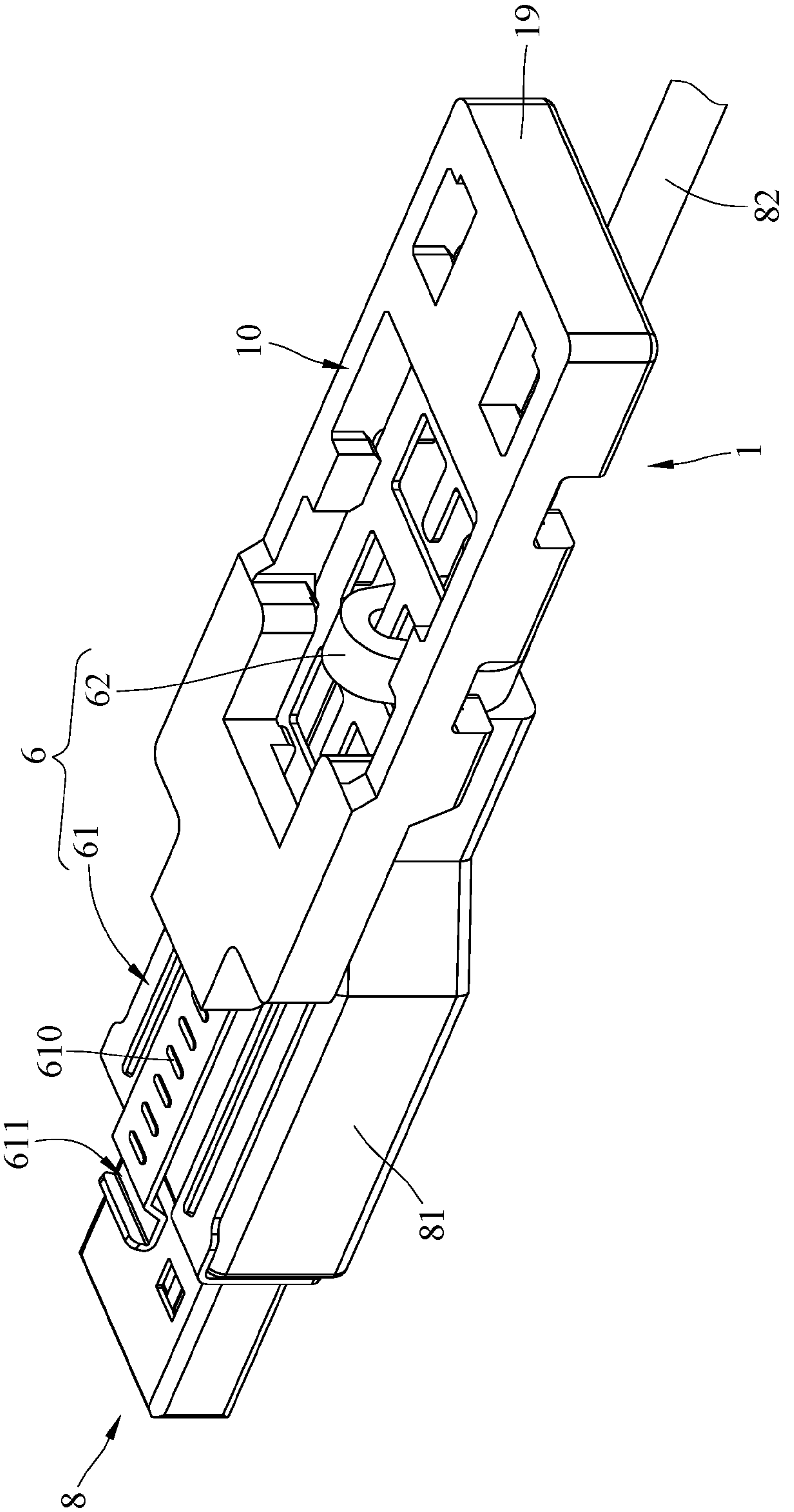

Specifically, the engagement component 61 may include an arm structure 610, and the arm structure 610 may have an engagement part 611 located at one end of the arm structure 610. Referring to FIGS. 1 and 3, when the plug 8 is inserted into the socket 710, the elasticity of the arm structure 610 enables the engagement part 611 to be maintained to be in an engagement position and engaged with the edge 711 of the socket 710. In such as case, the plug 8 is limited by the engagement of the engagement part 611 and the edge 711, such that the plug 8 is stably maintained to be inserted into the socket 710. When the arm structure 610 is elastically deformed by an external force, the engagement part 611 of the arm structure 610 is switched to a released position, such that the engagement part 611 is, for example, released from the edge 711 of the socket 710. At this moment, the limitation of the fixing assembly 6 and the input/output interface 71 to the plug 8 has been removed, and thus the plug 8 can be pulled out of the socket 710.

Figure 5:
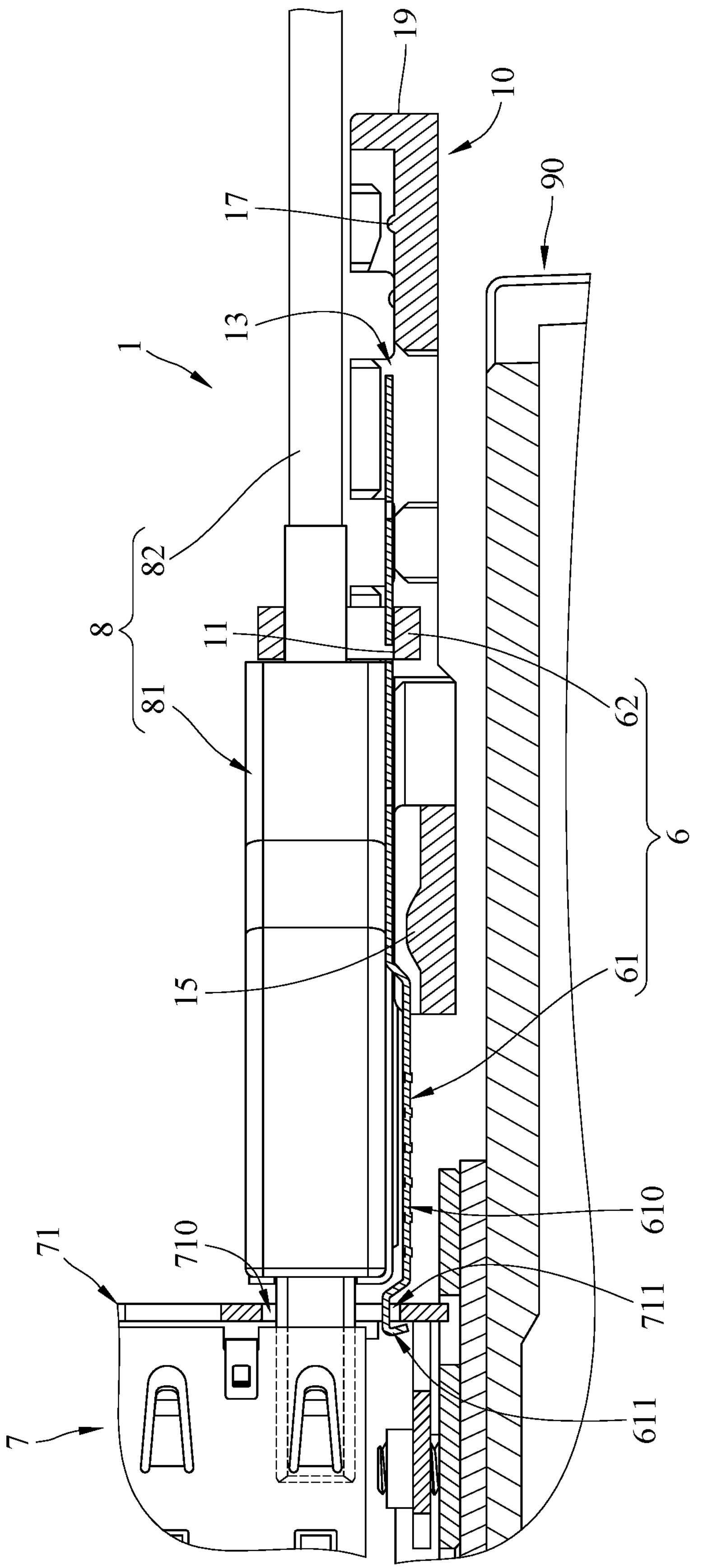
FIGS. 5 and 6 are cross-sectional views showing that the quick releasing mechanism in FIG. 2 disengages a fixing assembly from a socket.
Figure 6:
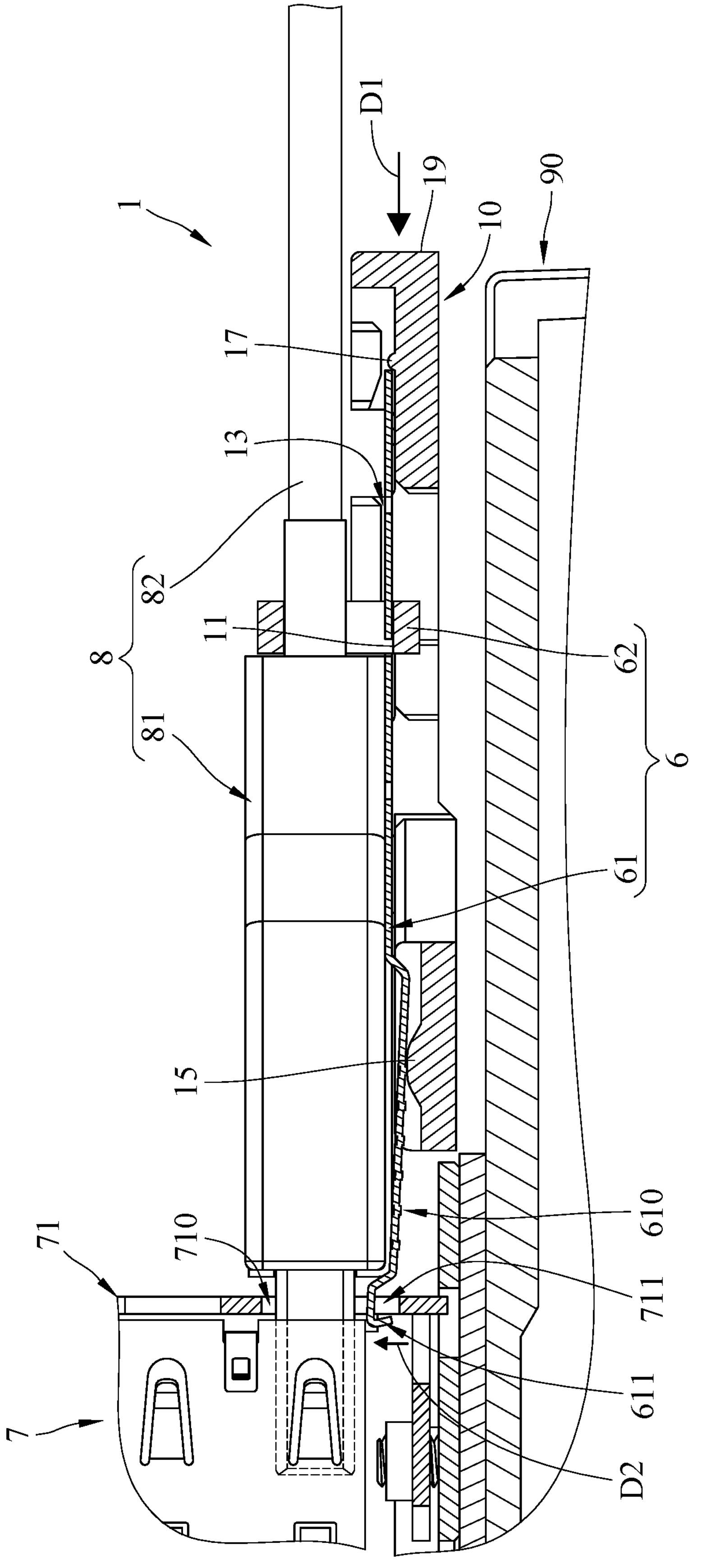

In order to move the arm structure 610 of the engagement component 61 to switch the engagement part 611 to be in the released position, the quick releasing mechanism 1 is movably disposed on the engagement component 61. As shown in the figures, in this embodiment, the releasing component 10 of the quick releasing mechanism 1 is slidably disposed on the engagement component 61 so as to have an unactuated state (e.g., as shown in FIG. 5 introduced later) and an actuated state (e.g., as shown in FIG. 6 introduced later). The releasing component 10 may be, but not limited to, a single piece made of plastic, metal or combination thereof. The releasing component 10 may have a support surface 11, at least one slide channel 13, a pressing protrusion 15 and an operation end 19. The support surface 11 is referred as a surface of the releasing component 10 which directly contacts or supports the engagement component 61. The slide channel 13 is referred as a structure of the releasing component 10 which receives or accommodates a side edge of the engagement component 61 so as to enable the engagement component 61 to be disposed through the releasing component 10. The pressing protrusion 15 is referred as a structure of the releasing component 10 which directly presses against the arm structure 610 of the engagement component 61 when the releasing component 10 is switched to the actuated state.

The operation end 19 is referred as a structure of the releasing component 10 which is located opposite to the pressing protrusion 15 and configured to be operated by the user to switch the state of the releasing component 10. Specifically, in this embodiment, the operation end 19 can be moved between an unactuated position (e.g., shown in FIG. 5 introduced later) to an actuated position (e.g., shown in FIG. 6 introduced later) along with the switching of the state of the releasing component 10, so that the user can operate the operation end 19 to selectively switch the releasing component 10 to the unactuated state or the actuated state.

In addition, optionally, the releasing component 10 may have at least one positioning protrusion 17. The positioning protrusion 17 protrudes from the support surface 11. When the operation end 19 is switched to the actuated position, the positioning protrusion 17 may be engaged with the engagement component 61 so as to fix the operation end 19 in the actuated position (or fix the releasing component 10 in the actuated state).

Then, referring FIGS. 1 and 5-6 for introducing the operation of the quick releasing mechanism 1. Firstly, as shown in FIGS. 1 and 5, when the plug 8 is inserted into one of the sockets 710 of the input/output interface 71, and the operation end 19 of the quick releasing mechanism 1 is not operated by the user so as to be maintained in the unactuated position, the releasing component 10 is in the unactuated state at this moment, and the engagement part 611 of the arm structure 610 of the engagement component 61 on the plug 8 is in the engagement position so as to be, for example, engaged with the edge 711 of the socket 710. As a result, the plug 8 is limited by the engagement between the engagement part 611 and the edge 711 so as to be stably maintained to be inserted into the socket 710.

Then, as shown in FIG. 6, the user can push the operation end 19 of the quick releasing mechanism 1 by, for example, fingers so as to force the releasing component 10 to move along a direction towards the socket 710 (e.g., shown by a first direction D1). In such process, the operation end 19 can be moved to the actuated position, the support surface 11 and the slide channel 13 of the releasing component 10 can ensure the releasing component 10 to slide relative to the engagement component 61 along a predetermined direction to be switched in the actuated state, and the pressing protrusion 15 of the releasing component 10 can be moved to a position to press against the arm structure 610, such that the arm structure 610 is elastically deformed so as to force the engagement part 611 of the arm structure 610 to be moved to the released position and thus, for example, to be disengaged from the edge 711 of the socket 710 (e.g., along a second direction D2). In other words, when the releasing component 10 is moved relative to the engagement component 61, the pressing protrusion 15 of the releasing component 10 presses against the arm structure 610 so as to force the engagement part 611 to rotate relative to the releasing component 10. By doing so, the plug 8 can be directly pulled out of the socket 710.

Accordingly, although the space around the socket 710 is too small to enable fingers to directly access the arm structure 610 of the engagement component 61 of the fixing assembly 6 due to the limitation of the interior space or the arrangement of the sockets 710, the quick releasing mechanism 1 enables the user to slightly push the operation end 19 of the releasing component 10 to remove the limitation of the engagement component 61 and the input/output interface 71 to the plug 8, thereby enabling the user to easily remove the plug 8 from the socket 710.

Figure 8:
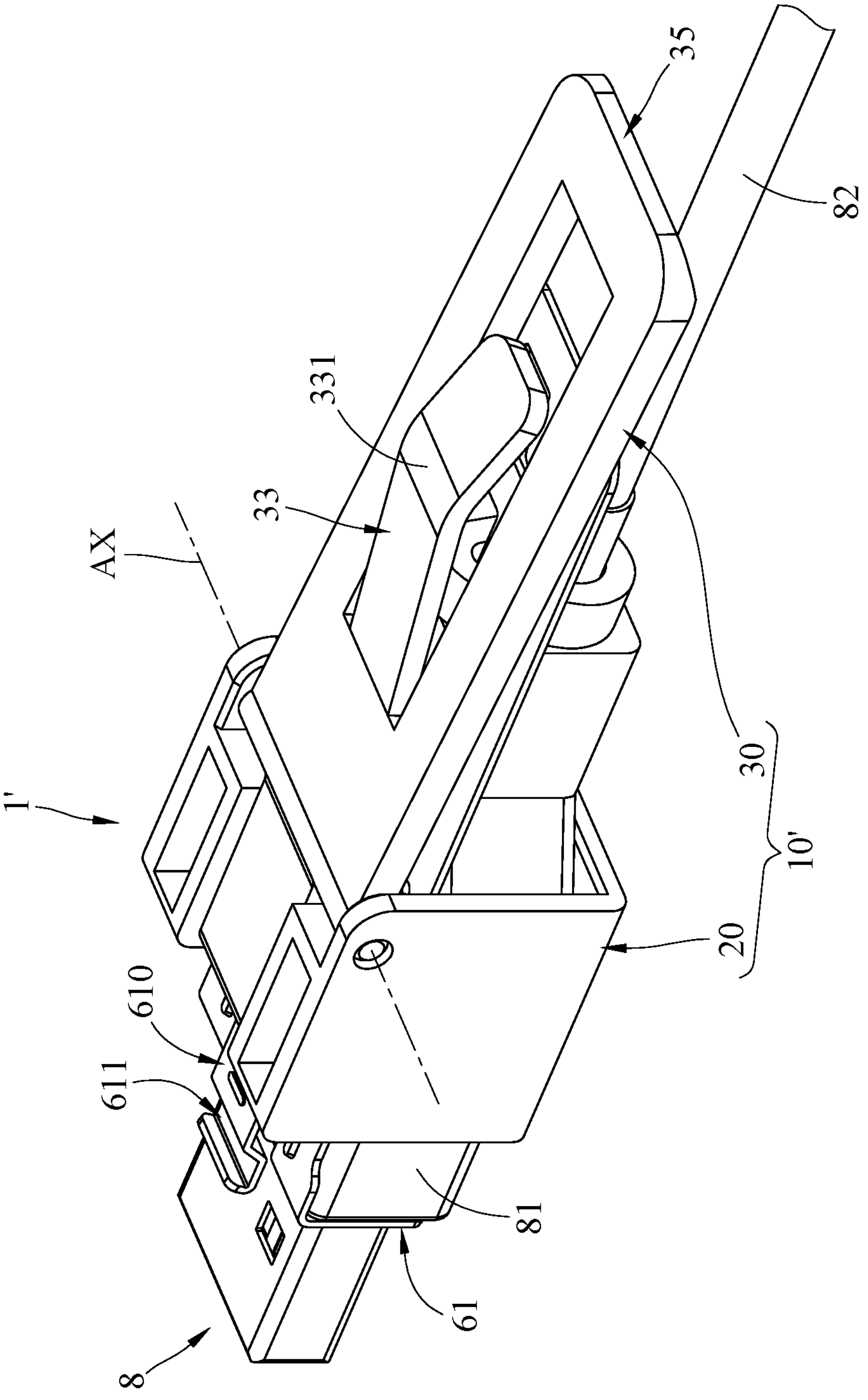
Figure 9:
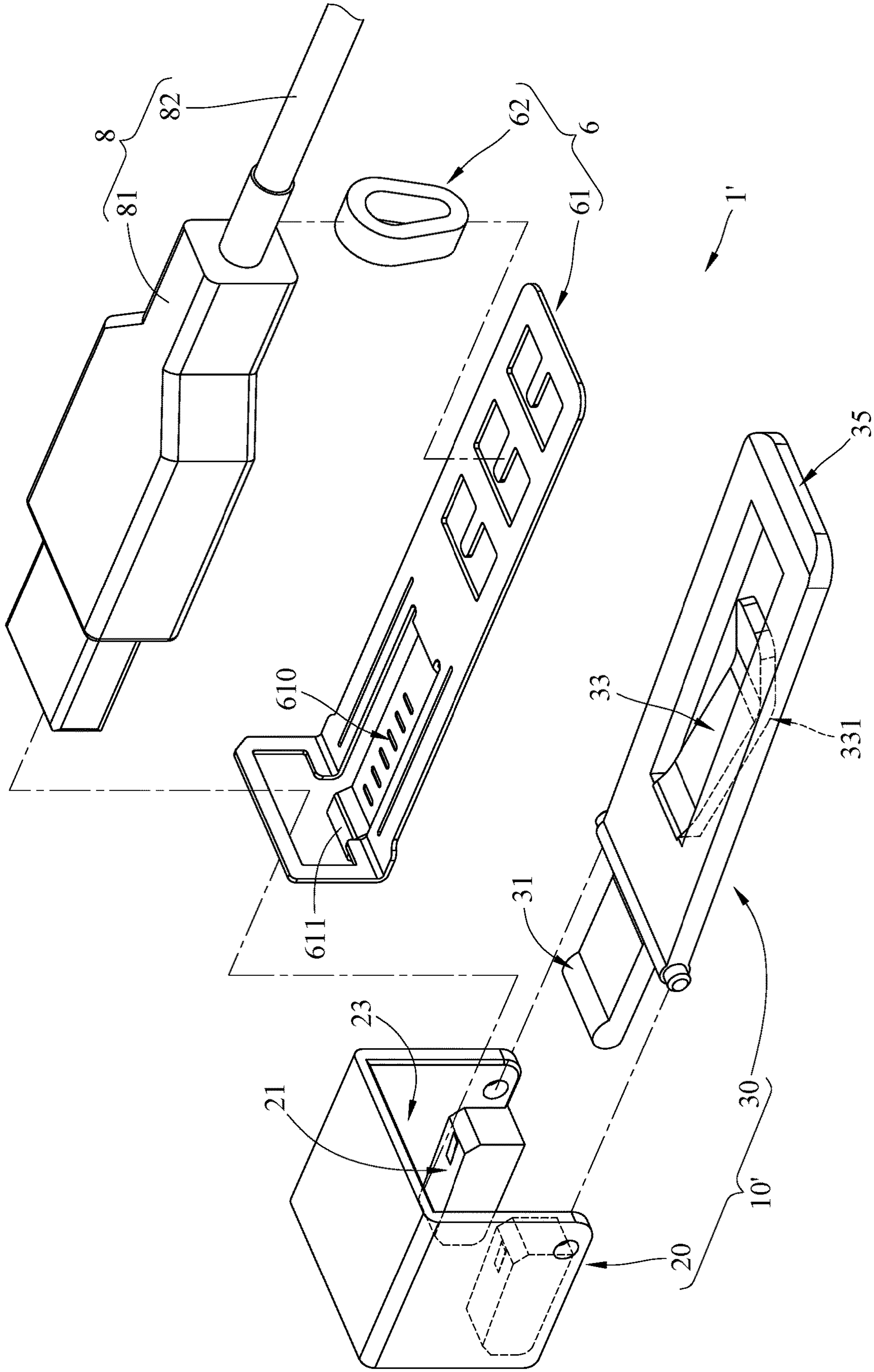
FIG. 9 is an exploded view of the plug and the quick releasing mechanism in FIG. 7.

The aforementioned quick releasing mechanism 1 is merely one of exemplary embodiments of the quick releasing mechanisms of the disclosure, but the disclosure is not limited thereto. For example, referring to FIGS. 7 to 9, another embodiment of the disclosure provides a quick releasing mechanism 1' which is capable of being applied to the environment of the aforementioned plug 8 and the aforementioned input/output interface 71. Note that for the purpose of brief illustration, the following paragraphs mainly introduce the differences between this embodiment and the previous embodiment, the similar or same parts between them may be referred to the corresponding paragraphs mentioned above, and thus will not be repeatedly introduced hereinafter. In addition, the same reference numerals may be referred to the same components or structures.

Figure 7:
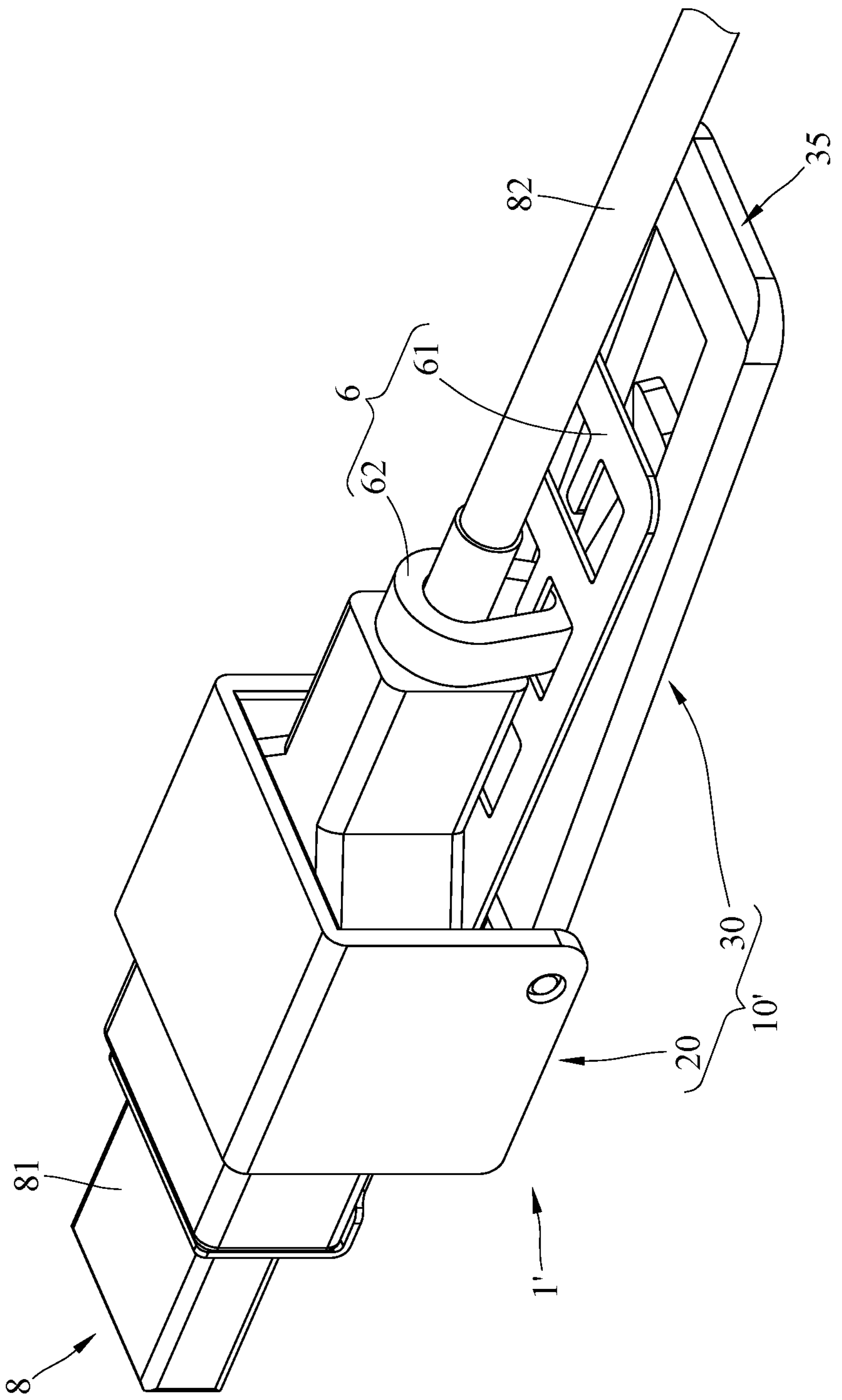
FIGS. 7 and 8 are perspective views of a plug and a quick releasing mechanism installed on the plug according to another embodiment of the disclosure.

As shown in FIG. 7, in this embodiment, a releasing component 10' of the quick releasing mechanism 1' may include a first element 20 and a second element 30. The first element 20 may be disposed on the engagement component 61 via a suitable means, such as snap-fit means, screws, bolts or adhesive. The second element 30 is movably connected to the first element 20 so as to be movably disposed on the engagement component 61 via the first element 20. Specifically, the second element 30 is swayably or pivotably disposed on the first element 20. As shown in the figures, the second element 30 is pivotable relative to the first element 20 about a pivotal axis AX.

Furthermore, the first element 20 may be, but not limited to, a single piece made of plastic, metal or another suitable material. The first element 20 may have a support surface 21 and at least one slide channel 23. The support surface 21 is referred as a surface of the releasing component 10' which directly contacts or supports the engagement component 61. The slide channel 23 is referred as a structure of the releasing component 10' which receives or accommodates a side edge of the engagement component 61 so as to enable the engagement component 61 to be disposed through the first element 20.

The second element 30 may be, but not limited to, a single piece made of plastic, metal or the combination thereof having a desired elasticity. The second element 30 may have a pressing protrusion 31, an elastic sheet structure 33 and an operation end 35. The pressing protrusion 31 is referred as a structure of the releasing component 10' which directly presses against the arm structure 610 of the engagement component 61 when the releasing component 10' is switched to the actuated state. The elastic sheet structure 33 is located between the pressing protrusion 31 and the operation end 35, and the elastic sheet structure 33 may have a contact protrusion 331. The contact protrusion 331 is referred as a portion of the elastic sheet structure 33 to contact an adjacent structure, such that when there is no external force applied on the operation end 35 (i.e., the operation end 35 is in the unactuated position), the pressing protrusion 31 is maintained to be a position not to force the arm structure 610 to be deformed (e.g., to force the pressing protrusion 31 to be spaced apart from the arm structure 610). The operation end 35 is referred as a structure of the releasing component 10' which is located opposite to the pressing protrusion 31 and configured to be operated by the user to move the second element 30.

Figure 10A:
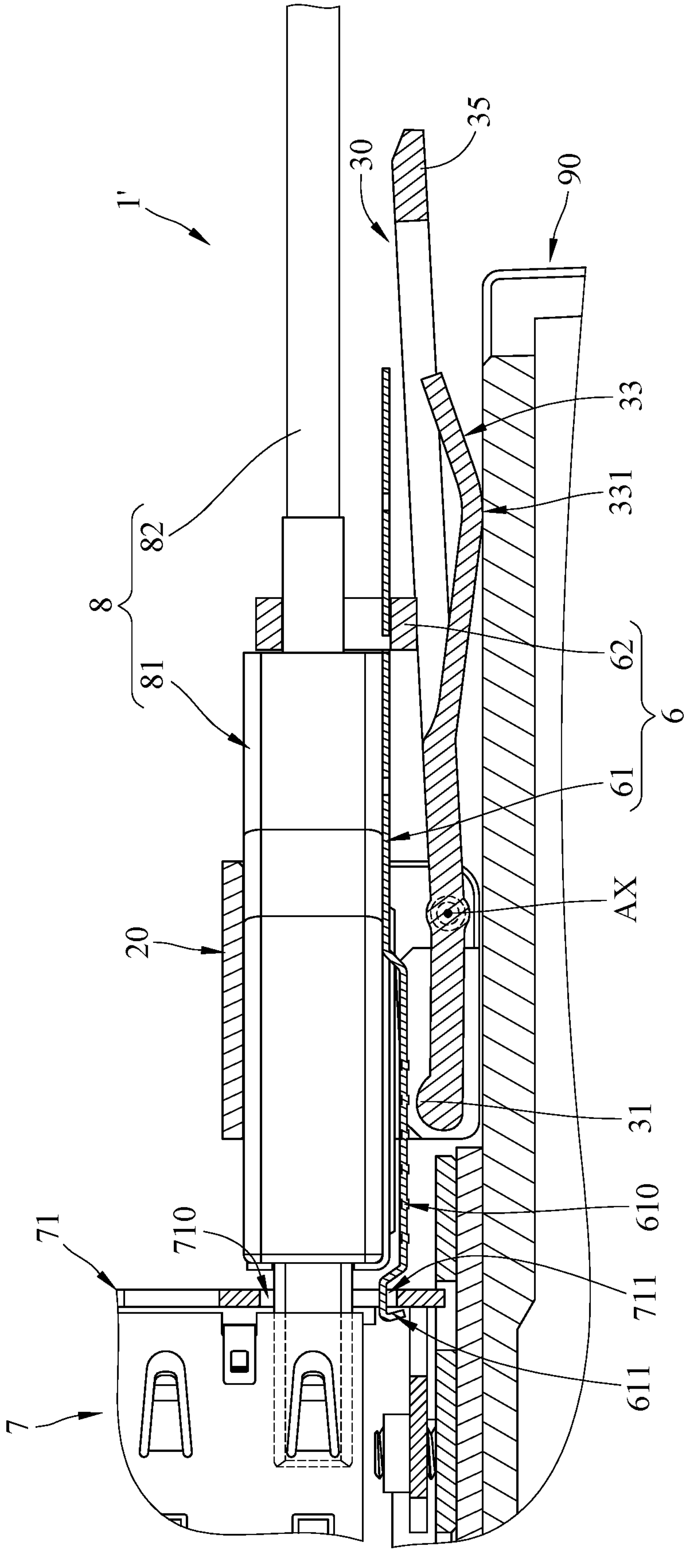
FIGS. 10A and 10B are cross-sectional views showing that the quick releasing mechanism in FIG. 7 disengages a fixing assembly from a socket.
Figure 10B:
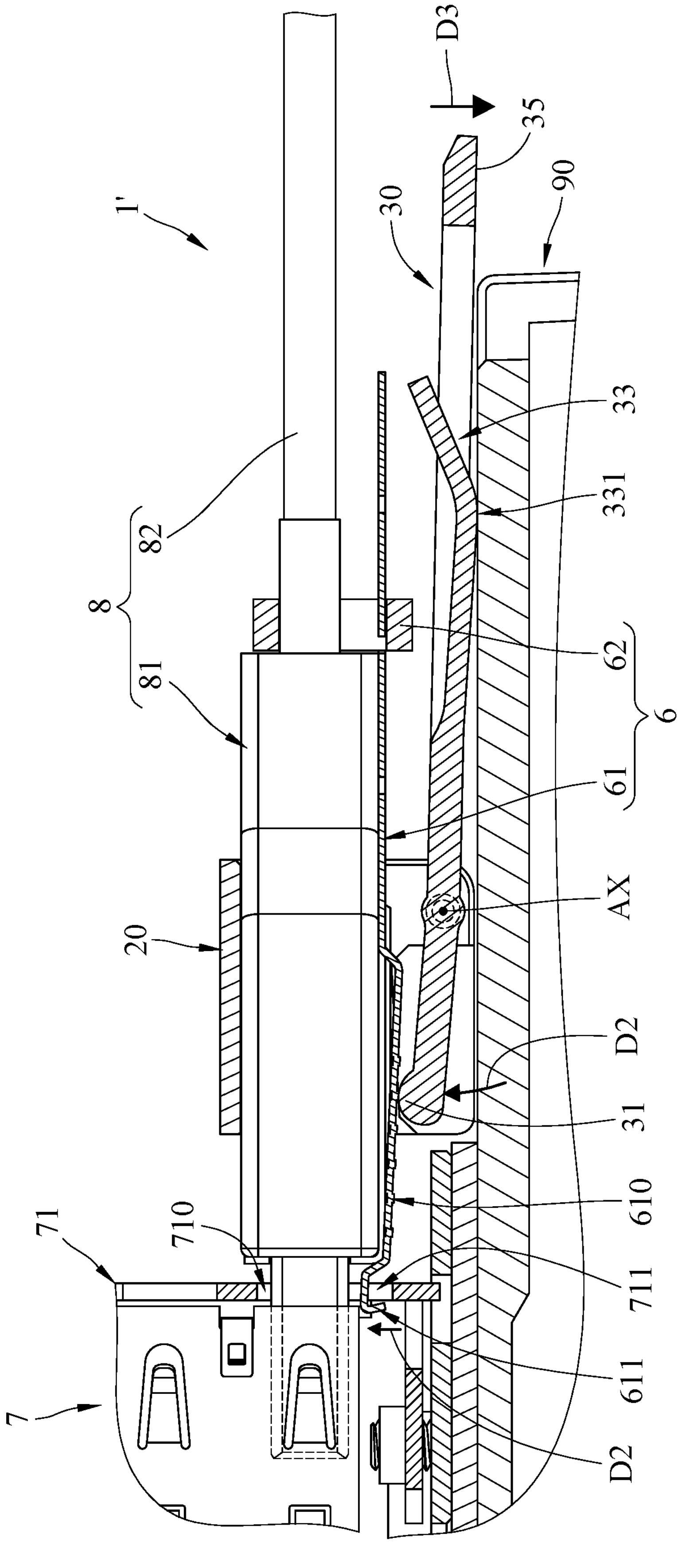

Then, referring to FIGS. 10A and 10B for introducing the operation of the quick releasing mechanism 1'. As shown in FIG. 10A, the operation end 35 is in the unactuated position, and the contact protrusion 331 forces the pressing protrusion 31 to be spaced apart from the arm structure 610. Then, as shown in FIG. 10B, the user can push the operation end 35 of the second element 30 of the quick releasing mechanism 1' by, for example, fingers (e.g., a third direction D3) to force the operation end 35 to move from the unactuated position to the actuated position. In such a process, the releasing component 10' is switched from the unactuated state to the actuated state, the pressing protrusion 31 of the second element 30 may be moved to a position to press against the arm structure 610 (e.g., the second direction D2), such that the arm structure 610 is elastically deformed so as to force the engagement part 611 of the arm structure 610 to be moved to the released position and thus, for example, disengaged from the edge 711 of the socket 710. By doing so, the plug 8 can be directly pulled out of the socket 710. It can be understood that since the contact protrusion 331 may, for example, tightly press against the support structure 90, the elastic sheet structure 33 may be elastically deformed when the second element 30 is pressed, and thus can be automatically rebounded when the second element 30 is released.

Accordingly, the quick releasing mechanism 1' enables the user to slightly push the operation end 35 of the quick releasing mechanism 1' to remove the limitation of the engagement component 61 and the input/output interface 71 to the plug 8, thereby enabling the user to easily remove the plug 8 from the socket 710.

Figure 11:
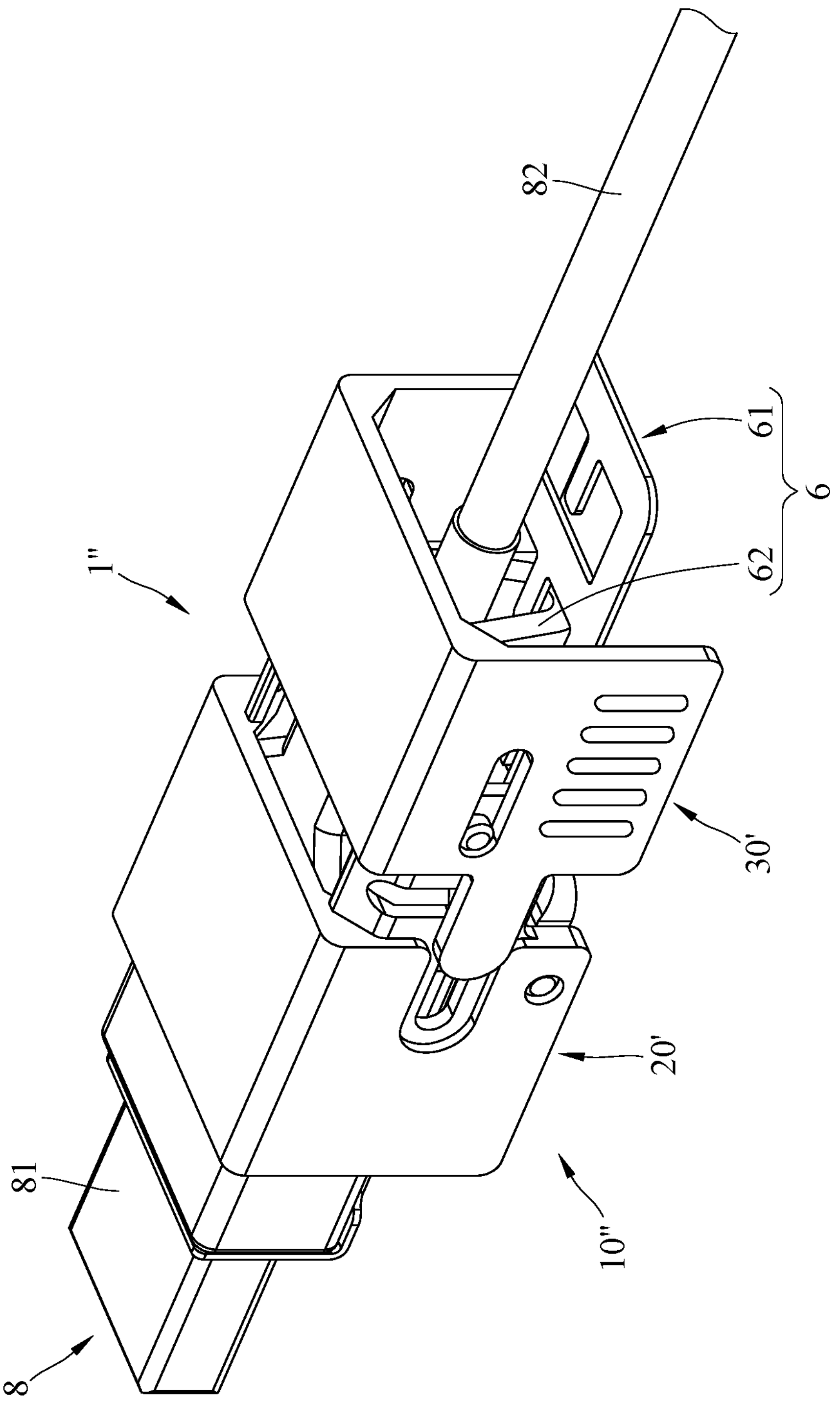
FIGS. 11 and 12 are perspective views of a plug and a quick releasing mechanism installed on the plug according to another embodiment of the disclosure.
Figure 14:
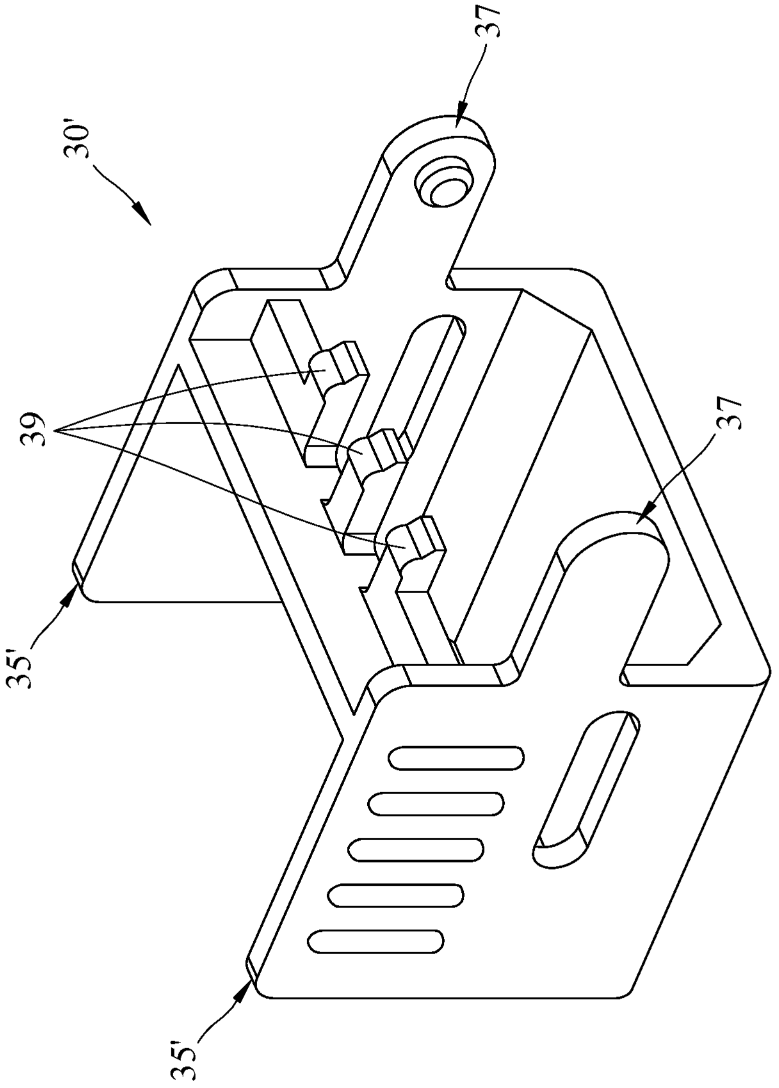
FIG. 14 is a perspective view of a third element of the quick releasing mechanism in FIG. 13.

Alternatively, referring to FIGS. 11 and 14, another embodiment of the disclosure provides a quick releasing mechanism 1" which is capable of being applied to the environment of the aforementioned plug 8 and the aforementioned input/output interface 71. Note that for the purpose of brief illustration, the following paragraphs mainly introduce the differences between this embodiment and the previous embodiment, the similar or same parts between them may be referred to the corresponding paragraphs mentioned above, and thus will not be repeatedly introduced hereinafter. In addition, the same reference numerals may be referred to the same components or structures.

Figure 12:
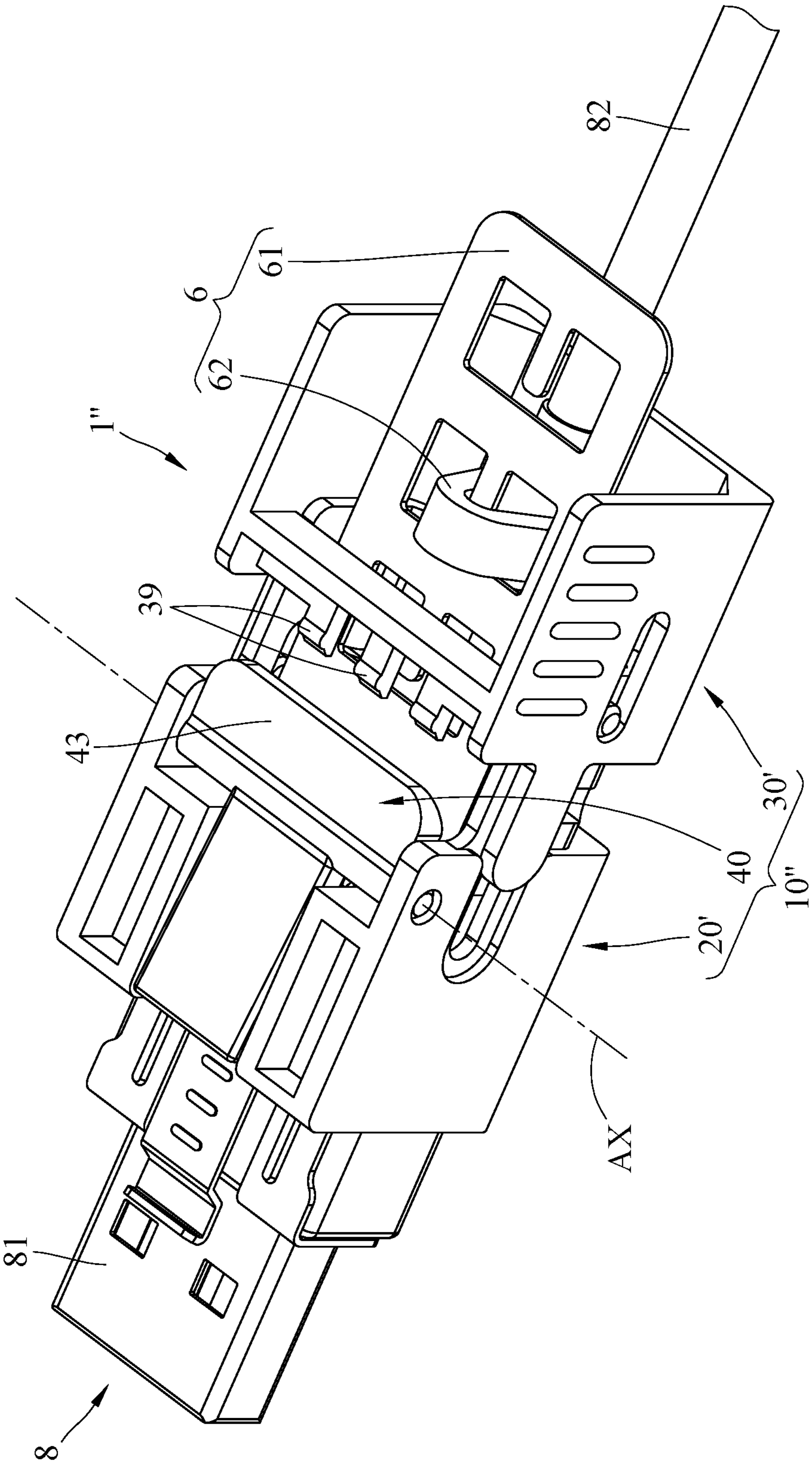
Figure 13:
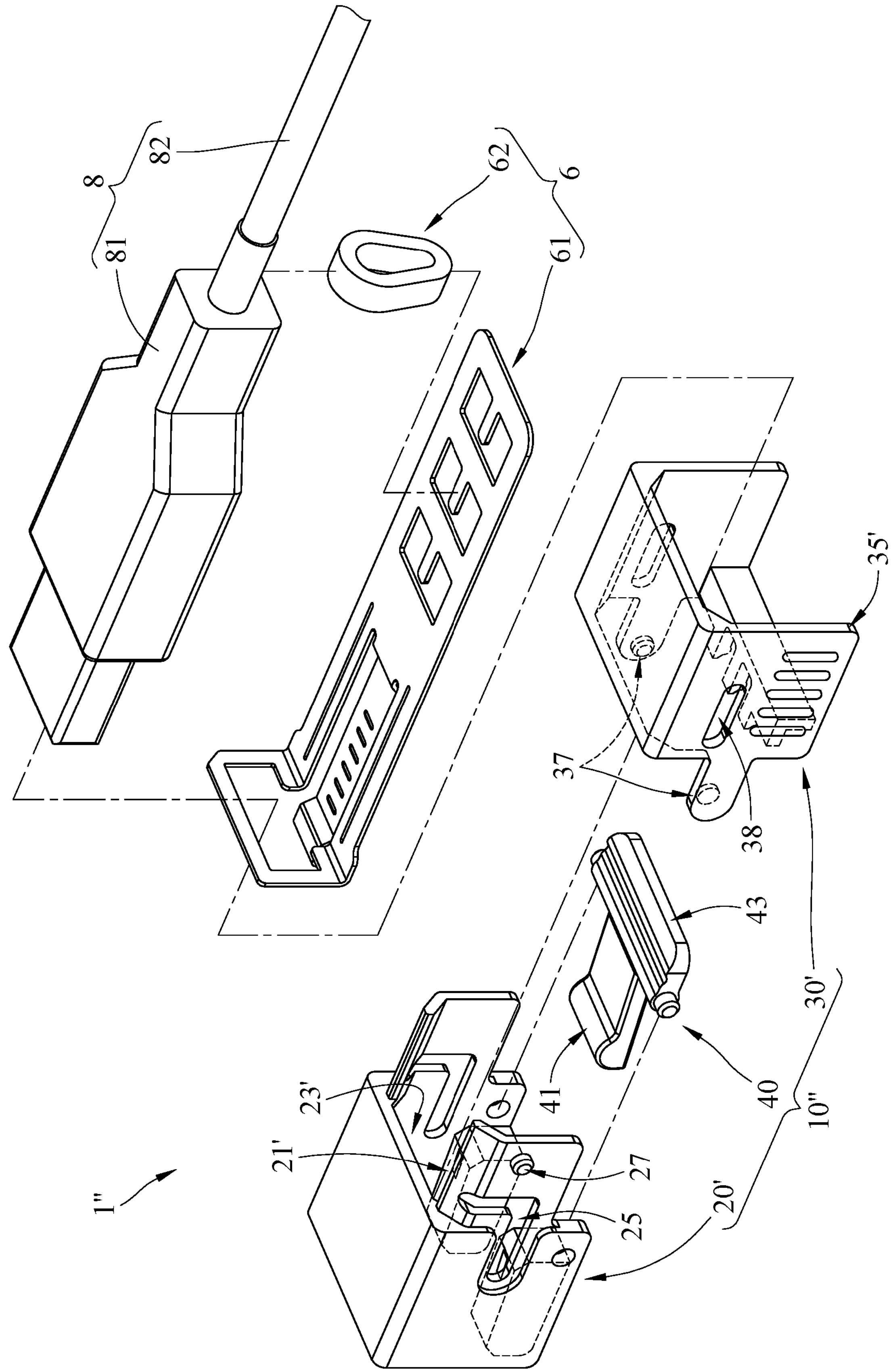
FIG. 13 is an exploded view of the plug and the quick releasing mechanism in FIG. 11.

As shown in FIG. 12, in this embodiment, a releasing component 10" of the quick releasing mechanism 1" may include a first element 20', a second element 30' and a third element 40. The first element 20' may be disposed on the engagement component 61 via a suitable means, such as snap-fit means, screws, bolts or adhesive. The second element 30' is movably connected to the first element 20' so as to be movably disposed on the engagement component 61 via the first element 20'. Specifically, the second element 30' is slidably disposed on the first element 20'. The third element 40 is swayably or pivotably disposed on the first element 20' so as to be movably disposed on the engagement component 61 via the first element 20'. As shown in the figures, the third element 40 is pivotable relative to the first element 20' about a pivotal axis AX.

Furthermore, the first element 20' may be, but not limited to, a single piece made of plastic, metal or another suitable material. The first element 20' may have a support surface 21' and at least one slide channel 23'. The support surface 21' is referred as a surface of the releasing component 10" which directly contacts or supports the engagement component 61. The slide channel 23' is referred as a structure of the releasing component 10" which receives or accommodates a side edges of the engagement component 61 so as to enable the engagement component 61 to be disposed through the first element 20'.

The second element 30' may be, but not limited to, a single piece made of plastic, metal or another suitable material. The second element 30' may have an operation end 35', and the operation end 35' is referred as a structure of the releasing component 10" to be touched by the user for moving the second element 30'. In addition, the first element 20' may have at least one first mount structure 25, the second element 30' may have at least one second mount structure 37. One of the first mount structure 25 and the second mount structure 37 may be a straight recess or a L-shaped recess, and the other one of the first mount structure 25 and the second mount structure 37 may be a protrusion structure adapted to be slidably disposed in the straight recess or the L-shaped recess. As a result, the second element 30' may be slidably mounted on the first element 20' via the second mount structure 37 and the first mount structure 25.

Optionally, the first element 20' may have at least one positioning block 27, and the second element 30' may have at least one positioning hole 38. The positioning block 27 is slidably disposed in the positioning hole 38, and the positioning hole 38 can limit a movable range of the positioning block 27; that is, the cooperation of the positioning hole 38 and the positioning block 27 can ensure or define a slidable distance of the second element 30' relative to the first element 20', where the slidable distance of the second element 30' can be referred as a maximum range distance of the second element 30'.

The third element 40 may be, but not limited to, a single piece made of plastic, metal or another suitable material. The third element 40 may have a pressing protrusion 41. The pressing protrusion 41 is referred as a structure of the releasing component 10" which directly presses against the arm structure 610 of the engagement component 61 when the releasing component 10" is switched to the actuated state. In addition, the second element 30' may have at least one pressing block 39 (e.g., shown in FIG. 14), and the third element 40 may have a pressed structure 43. The pressed structure 43 is referred as a portion of the third element 40 located opposite to the pressing protrusion 41, and the pressing block 39 is referred as a portion of the second element 30' to presses against the pressed structure 43.

Figure 15:
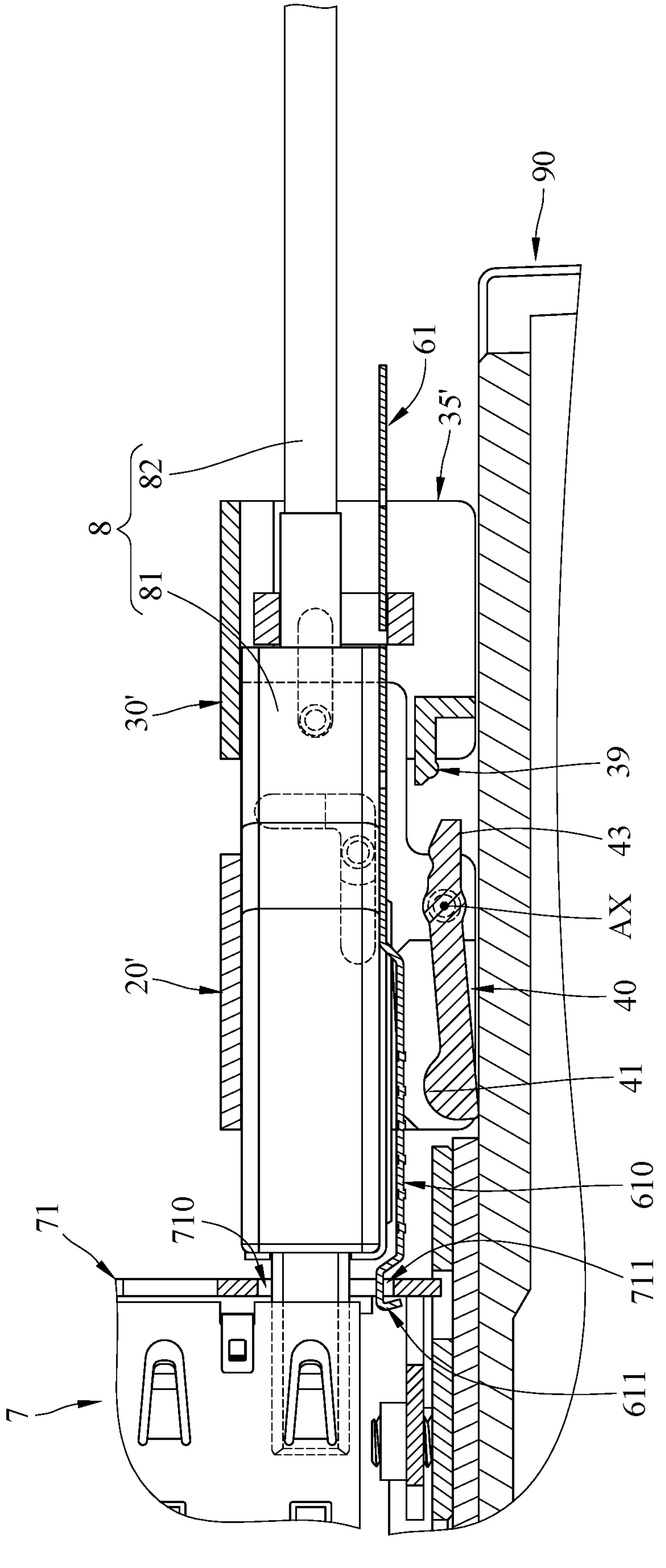
FIGS. 15 and 16 are cross-sectional views showing that the quick releasing mechanism in FIG. 11 disengages a fixing assembly from a socket.
Figure 16:
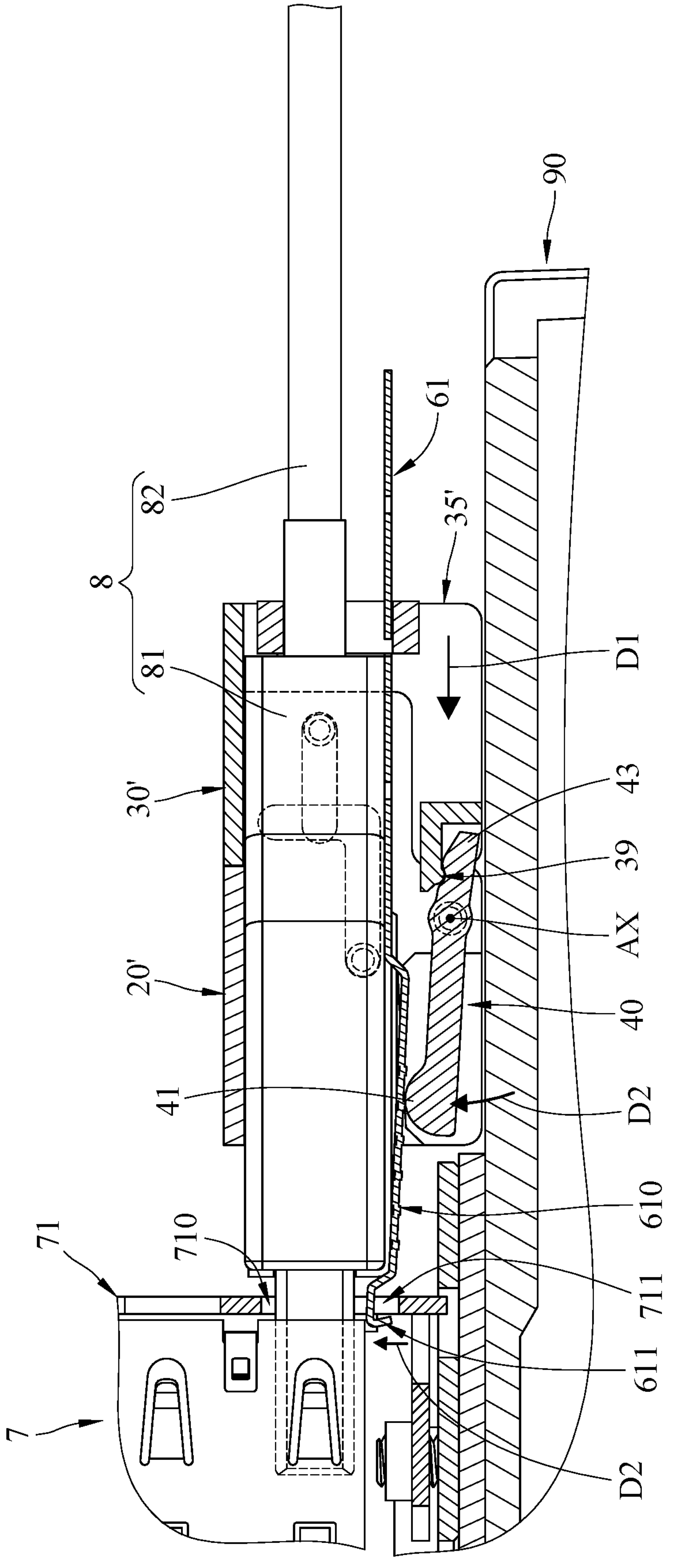

Then, referring to FIGS. 15 and 16 for introducing the operation of the quick releasing mechanism 1". Firstly, as shown in FIG. 15, when the plug 8 is inserted into one of the sockets 710 of the input/output interface 71, and the operation end 35' of the quick releasing mechanism 1" is not operated by the user so as to be maintained to be in the unactuated position, the engagement part 611 of the arm structure 610 of the engagement component 61 on the plug 8 is, for example, engaged with the edge 711 of the socket 710, at this moment, and the pressing block 39 of the second element 30' is in a position not to contact or move the pressed structure 43 of the third element 40. As a result, the plug 8 is limited by the engagement between the engagement part 611 and the edge 711 so as to be stably maintained to be inserted into the socket 710.

Then, referring to FIG. 16, the user can push the operation end 35' of the quick releasing mechanism 1" by, for example, fingers to force the second element 30' of the quick releasing mechanism 1" to move along a direction towards the socket 710 (e.g., the first direction D1). In such process, the releasing component 10" is switched from the unactuated state to the actuated state, the first mount structure 25 of the first element 20' and the second mount structure 37 of the second element 30' (e.g., shown in FIG. 14) can ensure the second element 30' to slide relative to the engagement component 61 along a predetermined direction, and the pressing block 39 of the second element 30' can be moved to a position to press against the pressed structure 43 of the third element 40, such that the third element 40 is swayed or pivoted (e.g., along the second direction D2) so as to force the pressing protrusion 41 of the third element 40 to press against the arm structure 610. As a result, the arm structure 610 is elastically deformed so as to force the engagement part 611 thereof to move to the released position and thus, for example, to be disengaged from the edge 711 of the socket 710 (e.g., along the second direction D2). By doing so, the plug 8 can be directly pulled out of the socket 710.

Accordingly, the quick releasing mechanism 1" enables the user to slightly push the operation end 35' of the quick releasing mechanism 1" to remove the limitation of the engagement component 61 and the input/output interface 71 to the plug 8, thereby enabling the user to easily remove the plug 8 from the socket 710.

According to the quick releasing mechanisms and the electronic device including the same as discussed in the above embodiments, at least part of the releasing component is movably disposed on the engagement component, and the releasing component includes the pressing protrusion to selectively press against the arm structure, such that when the engagement component is applied to the plug, the user can drive the releasing component to force the pressing protrusion to press against the arm structure so as to remove the limitation of the engagement component to the plug, thereby enabling the user to easily pull the plug out of the socket.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A releasing mechanism, comprising:
an engagement component, comprising an arm structure, wherein the arm structure has an engagement part; and
a releasing component, movably disposed on the engagement component, wherein the releasing component comprises a pressing protrusion for selectively pressing against the arm structure;
wherein when the releasing component is moved relative to the engagement component, the pressing protrusion of the releasing component presses against the arm structure to force the engagement part to rotate relative to the releasing component;
wherein the releasing component is directly slidably disposed on the engagement component.

2. The releasing mechanism according to claim 1, wherein the releasing component comprises an operation end located opposite to the pressing protrusion, and the releasing component is selectively switchable between an unactuated state and an actuated state.

3. The releasing mechanism according to claim 1, wherein the releasing component has a slide channel, the engagement component is disposed through the slide channel to be selectively switchable between a released position and an engagement position.

4. The releasing mechanism according to claim 2, wherein the releasing component has a support surface for supporting the engagement component, a positioning protrusion protrudes from the support surface, and the positioning protrusion is engaged with the engagement component when the releasing component is switched to the actuated state.

5. A releasing mechanism, comprising:
an engagement component, comprising an arm structure, wherein the arm structure has an engagement part; and
a releasing component, movably disposed on the engagement component, wherein the releasing component comprises a pressing protrusion for selectively pressing against the arm structure;
wherein when the releasing component is moved relative to the engagement component, the pressing protrusion of the releasing component presses against the arm structure to force the engagement part to rotate relative to the releasing component;
wherein the releasing component comprises an operation end located opposite to the pressing protrusion, and the releasing component is selectively switchable between an unactuated state and an actuated state;
wherein the releasing component comprises a first element, a second element and a third element, the second element is slidably disposed on the first element, the third element is pivotably disposed on the first element to be selectively pressed by the second element, and the pressing protrusion and the operation end are respectively located at the third element and the second element.

6. The releasing mechanism according to claim 5, wherein the second element has a pressing block, and the third element has a pressed structure located opposite to the pressing protrusion; when the releasing component is switched from the unactuated state to the actuated state, the pressing block presses against the pressed structure to force the pressing protrusion to press against the arm structure.

7. The releasing mechanism according to claim 5, wherein the first element has a first mount structure, the second element has a second mount structure, one of the first mount structure and the second mount structure is a straight recess, the other one of the first mount structure and the second mount structure is a protrusion, and the first mount structure is slidably disposed on the second mount structure.

8. The releasing mechanism according to claim 5, wherein the first element has a positioning block, the second element has a positioning hole, and the positioning block is slidably disposed in the positioning hole to define a slidable distance of the second element relative to the first element.

9. An electronic device, comprising:
an electronic assembly, having a socket; and
a releasing mechanism, comprising:
an engagement component, comprising an arm structure, wherein the arm structure has an engagement part; and
a releasing component, movably disposed on the engagement component, wherein the releasing component comprises a pressing protrusion for selectively pressing against the arm structure;
wherein when the releasing component is in an unactuated state, the pressing protrusion is spaced apart from the arm structure;
wherein when the releasing component is switched from the unactuated state to an actuated state, the pressing protrusion of the releasing component presses against the arm structure to force the engagement part to move from an engagement position to a released position for being disengaged from the socket.

10. The electronic device according to claim 9, wherein the releasing component comprises an operation end located opposite to the pressing protrusion.

11. The electronic device according to claim 9, wherein the releasing component has a slide channel, and the engagement component is disposed through the slide channel.

12. The electronic device according to claim 9, wherein the releasing component has a support surface for supporting the engagement component, and a positioning protrusion protrudes from the support surface to be engaged with the engagement component when the releasing component is switched to the actuated state.

13. The electronic device according to claim 10, wherein the releasing component comprises a first element and a second element, the second element is pivotably disposed on the first element, and the pressing protrusion and the operation end are located at the second element.

14. The electronic device according to claim 13, wherein the second element comprises an elastic sheet structure located between the pressing protrusion and the operation end, and the elastic sheet structure has a contact protrusion; when the releasing component is in the unactuated state, the contact protrusion forces the pressing protrusion to be spaced apart from the arm structure.

15. The electronic device according to claim 10, wherein the releasing component comprises a first element, a second element and a third element, the second element is slidably disposed on the first element, the third element is pivotably disposed on the first element to be selectively pressed by the second element, and the pressing protrusion and the operation end are respectively located at the third element and the second element.

16. The electronic device according to claim 15, wherein the second element has a pressing block, and the third element has a pressed structure located opposite to the pressing protrusion; when the releasing component is switched from the unactuated state to the actuated state, the pressing block presses against the pressed structure to force the pressing protrusion to press against the arm structure.

17. The electronic device according to claim 15, wherein the first element has a first mount structure, the second element has a second mount structure, one of the first mount structure and the second mount structure is a straight recess, the other one of the first mount structure and the second mount structure is a protrusion, and the first mount structure is slidably disposed on the second mount structure.

18. The electronic device according to claim 15, wherein the first element has a positioning block, the second element has a positioning hole, and the positioning block is slidably disposed in the positioning hole to define a slidable distance of the second element relative to the first element.

* * * * *